United States Patent [19]

Westcott

[11] 4,081,188

[45] Mar. 28, 1978

[54] PAPER HAVING MICROCAPSULES DEPOSITED IN DEPRESSIONS ON A SURFACE THEREOF HAS IMPROVED SMUDGE-RESISTANCE CHARACTERISTICS

[75] Inventor: Lawrence Westcott, Cefn Cribwr, near Bridgend, Wales

[73] Assignee: Wiggins Teape Limited, London, England

[21] Appl. No.: 724,696

[22] Filed: Sep. 17, 1976

Related U.S. Application Data

[63] Continuation of Ser. No. 504,189, Sep. 9, 1974, abandoned.

[30] Foreign Application Priority Data

Sep. 13, 1973 United Kingdom ............... 43123/73

[51] Int. Cl.[2] .......................... B32B 3/16; B41L 1/36; B41M 5/16; B41M 5/22

[52] U.S. Cl. .................................... 282/27.5; 162/290; 427/150; 427/152; 428/173; 428/206; 428/207; 428/211; 428/212; 428/306; 428/914

[58] Field of Search ............... 428/173, 206, 207, 211, 428/306, 323, 326, 914, 212; 282/27 R, 28 R, 27.5; 346/134; 162/135, 231; 427/152, 150

[56] References Cited

U.S. PATENT DOCUMENTS

| | | | |
|---|---|---|---|
| 3,111,407 | 11/1963 | Lindquist et al. | 282/28 R |
| 3,389,007 | 6/1968 | Oda et al. | 428/323 |
| 3,411,935 | 11/1968 | Winzer | 428/173 |
| 3,536,517 | 10/1970 | van den Heuvel el al. | 428/306 |
| 3,753,761 | 8/1973 | Sugahara et al. | 428/306 |

*Primary Examiner*—J.C. Cannon

*Attorney, Agent, or Firm*—Burns, Doane, Swecker & Mathis

[57] ABSTRACT

Paper for use in pressure-sensitive copying systems consists of a base paper one surface of which is machine glazed and the opposite surface of which is left rough due to expulsion of moisture during manufacture. Those sheets which are provided with a color reactant have the reactant applied to the glazed surfaces thereof and those sheets which are provided with a microcapsule coating have the microcapsule coating applied to the rough surfaces thereof.

4 Claims, 7 Drawing Figures

PAPER HAVING MICROCAPSULES DEPOSITED IN DEPRESSIONS ON A SURFACE THEREOF HAS IMPROVED SMUDGE-RESISTANCE CHARACTERISTICS

This is a continuation, of application Ser. No. 504,189, filed Sept. 9, 1974, and now abandoned.

BACKGROUND OF THE INVENTION

1. Field of the Invention

This invention relates to coated paper for use in so-called "clean-to-handle" pressure-sensitive copying systems.

2. Description of the Prior Art

One known clean-to-handle pressure-sensitive copying system comprises an upper sheet, known as a CB sheet, which is coated on its lower surface with pressure-rupturable microcapsules containing a solution of a colour former material, and a lower sheet, known as a CF sheet, which is coated on its upper surface with a colour reactant material, such as an acidic clay or a phenolic resin. For most applications, a number of intermediate sheets, known as CFB sheets, are also provided each of which is coated on its lower surface with microcapsules and on its upper surface with colour reactant material. The pressure exerted on the sheets by writing or typing ruptures the microcapsules, thereby releasing the colour former solution onto the reactant material on the next lower sheet and giving rise to a chemical reaction which develops the colour of the colour former. The microcapsules are usually applied in aqueous suspension.

The above described pressure-sensitive copying system will hereinafter be called a "pressure-sensitive copying system of the kind referred to".

CF sheets in which the colour reactant material is an acidic clay have hitherto been manufactured by coating, e.g. blade coating, a suitable base paper with an aqueous coating mix, and for this purpose it is desirable for the base paper to have as smooth a surface as possible, since a smooth surface allows a low colour reactant material coat weight to be used, whilst still affording the desired CF properties. The desired smoothness is normally obtained by calendering the base paper prior to coating thereof, and such calendering also serves to make the surface of the base paper compact, which minimises migration of the subsequently applied coating into the base paper. The base paper is normally calendered again after coating in order to make the coating compact and give it a smooth surface. A smooth CF surface is desirable since when a CB or CFB sheet overlies the CF sheet there will be a tendency for any roughnesses of the CF surface to snag the microcapsules on the CB surface, which may lead to premature rupture of the microcapsules, or "smudging" as it is usually known.

Similarly, base paper for the manufacture of CB sheets has hitherto been calendered to provide a compact surface prior to application of an aqueous microcapsule dispersion thereto. The microcapsule dispersion may for example be applied by means of an air-knife coater. However, the smoothness resulting from calendering of the CB sheet base paper would lead to the microcapsules standing out from the surface of the base paper, in which position they would be very prone to accidental rupture, for example during handling operations. It has therefore become a normal practice to coat the microcapsules onto the surface together with a so-called stilt material, such as cellulose fibres or starch granules, the dimensions of which are such that the stilt material protrudes further from the base paper than the microcapsules. The stilt material therefore serves to protect the microcapsules against accidental rupture while still allowing rupture under typing or writing pressure.

The presence of stilt material adds to the expense of CB and CFB sheets, and may also lead to problems in coating the base paper with microcapsule suspension.

SUMMARY

It has now been found that the use of machine glazed paper as the base paper obviates the need for stilt materials, or at least renders their presence necessary in smaller amounts, and affords a number of other advantages.

Accordingly, therefore, the invention provides in a first aspect a coated paper for use in pressure-sensitive copying system of the kind referred to, of which the base paper has been machine glazed, the colour reactant, when present, being on the glazed surface of the base paper, and the microcapsule coating, when present, being on the rough surface of the base paper.

The coated paper may be a CF sheet, in which case colour reactant will be present and microcapsules will be absent, or a CB sheet, in which case colour reactant will be absent and microcapsules will be present, or a CFB sheet in which case colour reactant and microcapsules will both be present.

In a third aspect, the invention provides a process for manufacturing coated paper for use in a pressure-sensitive copying system of the kind referred to, comprising the steps of drying a paper web which has been formed on a papermaking machine wire by means of a machine glazing cylinder, and applying a coating of a colour reactant material to the glazed surface of the web, and/or applying a coating of microcapsules to the rough surface of the web.

In a fourth aspect, the invention provides apparatus for manufacturing coated paper for use in a pressure-sensitive copying system of the kind referred to, comprising a papermaking wire or wires for formation of a wet paper web, a machine-glazing cylinder for drying the web and imparting to the web a high glaze on one surface, while leaving the other surface rough, a coater for coating the glazed surface of the web with colour reactant material, and/or a coater for coating the rough surface of the web with microcapsules.

Machine-glazed paper, usually known as MG paper, is paper which has been dried, after formation on the wire of a papermaking machine, with one surface in contact with a highly polished, heated drying cylinder, known as an MG cylinder, with the result that the surface contacting the cylinder is given an extremely smooth finish, while the other surface of the web becomes rough owing to water being expelled from the web through said other surface.

Hitherto, MG paper has generally been made in poor quality grades only, where opposite surfaces of markedly different roughness can be tolerated, and its use has not been considered where quality, i.e. surfaces of similar smoothness is important. Base paper for the present purpose may, however, be made from furnishes which are conventional for base paper for use in a pressure-sensitive copying system of the kind referred to.

Whereas MG paper is dried by means of an MG cylinder, base paper for CF, CB and CFB sheets has conventionally been dried on drying cylinders and then calendered, as has already been described.

An MG paper can have a glazed surface much smoother than the surface which can be obtained by calendering or super-calendering a conventionally manufactured base paper, which, as discussed previously, permits the use of a small coat weight of colour reactant material whilst still providing the desired properties in the coated product. A further advantage of MG paper for the present purpose is that the glazed surface is virtually sealed, and thus there is a low loss of applied colour reactant material by migration into the MG paper. There is also no need to calender the paper after coating since the smoothness of the glazed surface of the MG paper is such that the coating applied thereto inherently has a satisfactory smoothness and resistance to smudging. The colour reactant material, e.g. an acidic clay, can be applied by blade coating, for example. Yet a further advantage of MG paper is that it has a good dimensional stability.

Although calendering is unnecessary for smoothing purposes it may be desirable to employ slight calendering to provide a draw station for drawing the paper web through the machine, and to provide fine control of surface smoothness. A single-nip calender may, for example be used, and it will be appreciated that this does not compare in severity with conventional calendering.

It is thought that it is the roughness of the unglazed surface of an MG paper which allows microcapsules to be applied without the need for any stilt material to prevent accidental rupture of the capsules, since the high spots of the unglazed surface generally protrude further from the body of the base paper than do the microcapsules. The high spots, therefore, function in a similar manner to conventional stilt material. Since the microcapsules can be coated onto the base paper by themselves, i.e. without any simultaneous coating of stilt material, a more uniform coating of the microcapsules can be obtained which reduces the coat weight necessary to obtain desired properties. A further advantage of the use of MG paper is that since separate stilt material is not essential, problems caused by loss of such material from manufactured sheets, known as dusting problems, do not arise. Another advantage is that by control of the manufacturing operation the roughness of the unglazed surface of the MG paper can be controlled in dependence upon the size of the microcapsules to be coated thereon. An air-knife coater, for example, can be used to coat the microcapsules (in aqueous suspension).

In conventional paper making it is normal to size the paper web internally, and also to apply starch by means of a size press, in order to prevent a subsequently applied aqueous coating mix, for example a microcapsule or colour reactant material coating mix, from penetrating too far into the paper web. Starch sizing is normally carried out using a size press apparatus. It has also been proposed to apply dyes to a paper web using a size press apparatus, which affords the advantage that only white paper webs have to be produced at the wet end of the paper making machinery since any desired colours can be applied at the size press. A further advantage of this procedure is that the problems associated with dyeing and the duration of dyeing are reduced.

It has been found that such size press sizing and dyeing can be carried out on an MG paper if desired, without unduly harming the above described advantageous surface characteristics of the MG paper, and thus coated paper according to the present invention which is coloured can readily be produced. Starch sizing can be dispensed with altogether, if desired.

DESCRIPTION OF THE PREFERRED EMBODIMENT

Figure 1:
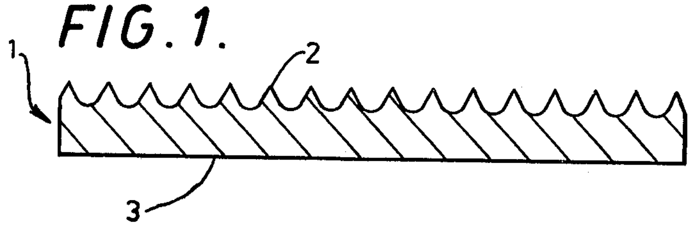
FIG. 1 is a cross-section through an uncoated MG paper.

Referring first to FIG. 1, a sheet of uncoated MG paper 1 has one rough surface 2, the roughness being due to the expulsion of moisture from the paper through this surface 2 during manufacture, and one extremely smooth surface 3 which has been in contact with a highly polished, heated drying cylinder during manufacture. The rough surface 2 may, for example, have a Bendsten roughness of between 700 and 1000 ml/min, while the smooth surface may, for example, have a Bendsten roughness of less than 100 ml/min, which is smoother than can readily be obtained by calendering or super-calendering a conventionally manufactured paper.

Figure 2:
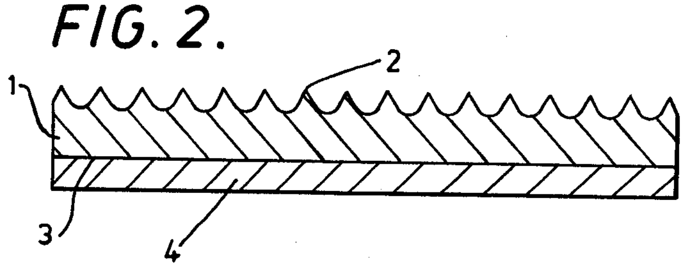
FIG. 2 is a cross-section through a CF sheet having an MG paper base.

Referring now to FIG. 2, there is shown a CF sheet which has been manufactured from the MG paper 1 shown in FIG. 1 by applying a coating 4 of a colour-reactant material such as an acidic clay or a phenolic resin material to the glazed surface 3 of the MG paper 1, by blade coating or other coating technique. The smoothness of the coating which can be obtained is such that calendering of the paper after coating is unnecessary and that a low coat weight can be used.

Figure 3:
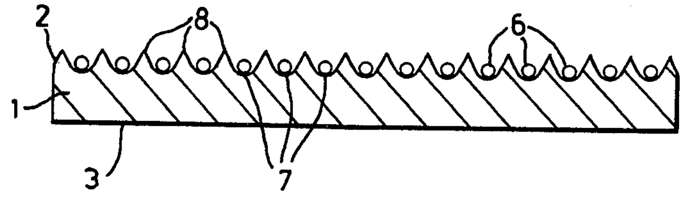
FIG. 3 is a cross-section through a CB sheet having an MG paper base.

Referring now to FIG. 3, there is shown a CB sheet which has been manufactured from the MG paper 1 shown in FIG. 1 by applying a coating of microcapsules 6 to the unglazed surface 2 of the MG paper 1, by air-knife coating or other coating technique. Various suitable kinds of microcapsules and various suitable colour former materials are well known in the art and will not therefore be discussed in detail herein. Owing to the roughness of the unglazed surface 2, and to the fact that the microcapsules 6 tend to lie in depressions 7 in the unglazed surface 2, the microcapsules 6 are protected against accidental rupture after coating by high spots 8 of the rough unglazed surface 2.

Figure 4:
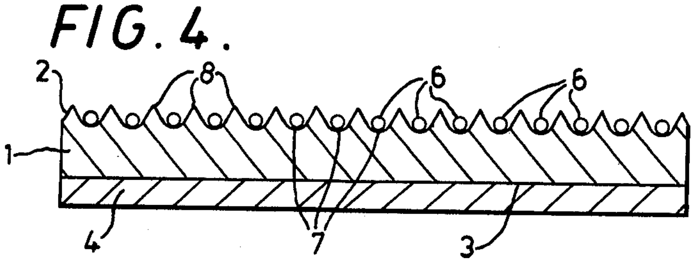
FIG. 4 is a diagrammatic cross-section through a CFB sheet having an MG paper base.

Referring now to FIG. 4 there is shown a CFB sheet which has been manufactured from an MG paper 1 as shown in FIG. 1 by coating a colour reactant material coating 4 on its glazed surface 3, and a coating of microcapsules 6 on its unglazed surface 2. It will be appreciated that in FIGS. 1 to 4, the rough surface is shown as being uppermost, whereas in use, the smooth surface will be uppermost to provide the writing surface, and the rough surface will be face down.

Figure 5:
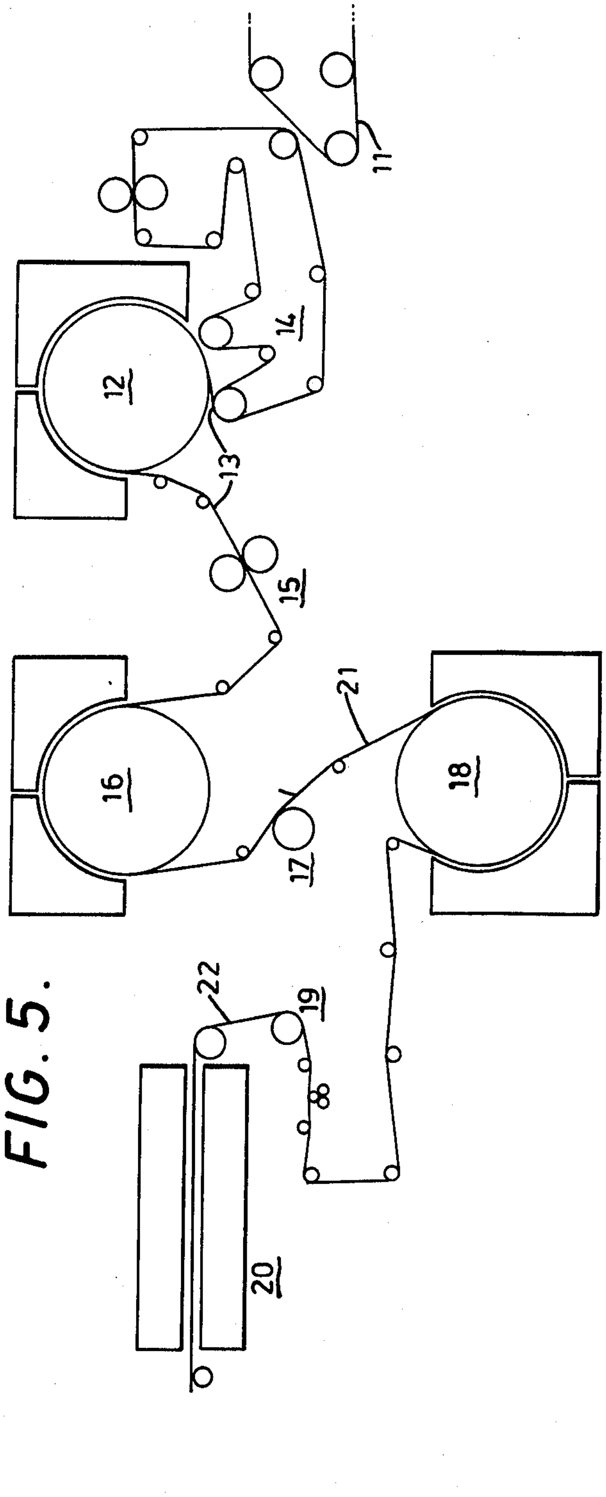
FIG. 5 is a schematic diagram of a first embodiment of apparatus according to the invention for manufacturing a CFB sheet as shown in FIG. 4.

Referring now to FIG. 5, a paper web 13 produced on a papermaking machine wire 11 is passed to a first MG cylinder 12 by means of a felt and roller arrangement 14. After drying on the cylinder 12 the paper web 13 passes through a conventional size press apparatus 15 where it is sized and dyed as desired. After being sized and dyed the paper web 13 is passed around a second unfelted MG cylinder 16 to dry the sized and dyed web.

From the cylinder 16 the paper web is passed to a conventional coating apparatus, e.g. a Bill-blade 17 or a trailing blade, where a colour reactant material coating is applied to the now glazed surface of the paper web to produce a coated paper web 21. From the coating apparatus 17 the coated paper web 21 is passed around a third MG cylinder 18 which dries the applied colour reactant material coating. The web 21 is then passed to an air-knife coating apparatus 19 by means of which a microcapsule coating is applied to the unglazed uncoated surface of the paper web 21 to produce a web 22 which is coated on both surfaces. From the coating apparatus 19 the web 22 is passed through a drying apparatus 20, for example an air-suspension drying apparatus, and is then reeled up at a reel-up station (not shown), in the form of CFB paper as shown in FIG. 4. Instead of the third MG cylinder 18, an air-suspension drying apparatus may be used if desired.

By omitting the coating apparatus 19 and the drying apparatus 20 the machinery described above can be used to manufacture CF paper as shown in FIG. 2, and by omitting the coating apparatus 17 and the cylinder 18 the machinery can be used to manufacture CB paper as shown in FIG. 3. The size press apparatus 15 and the cylinder 16 may if desired be omitted in which case the paper web 13 may be sized and dyed as necessary by suitable additions to the stock from which the paper web 13 is manufactured.

Figure 6:
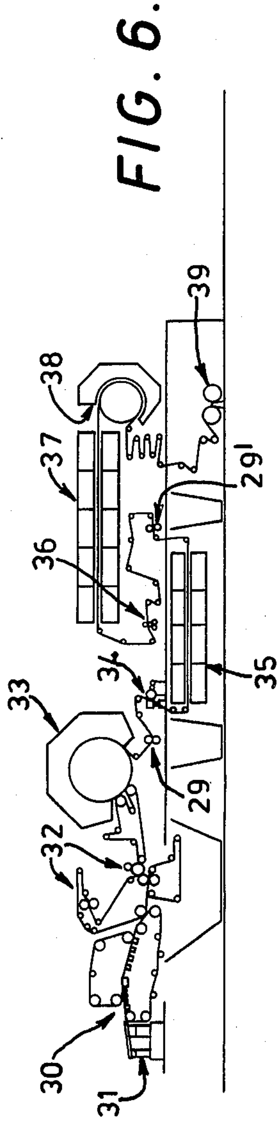
FIG. 6 is a schematic diagram of a second embodiment of apparatus according to the invention for manufacturing a CFB sheet as shown in FIG. 4.

Referring now to FIG. 6, there is shown apparatus comprising a twin-wire papermaking station generally designated 30, arranged to be supplied with pulp from a head box 31. A web produced at the station 30 is dewatered at a press-felt station generally designated 32, and passed to an MG cylinder drying station 33 for final drying. A CF coating is applied at a CF coating station 34, which as shown is a Bill-blade coater, but may be another type of coater. The CF coating is dried by means of a float drying apparatus 35. The web then passes to a CB coating station 36, which as shown is a reverse-roll coater, but may be another type of coater. The CB coating is dried initially by means of a float drying apparatus 37 and finally by means of a vacuum through-drying cylinder 38. The dried coated web is then reeled up at a reeling-up station 39. Two single-nip calenders 29, 29' are provided to draw the web through the apparatus, and are located immediately after the drying stations 33 and 35 respectively.

It will be appreciated that the apparatus can be modified to produce CB paper by omitting the CF coating and drying stations, or to produce CF paper by omitting the CB coating and drying stations.

FIG. 6 shows the apparatus in more detail than has just been described, but this detail is not material to the invention, and so further description is unnecessary for present purposes. In any case, a papermaker will have no difficulty in identifying the additional features shown.

Figure 7:
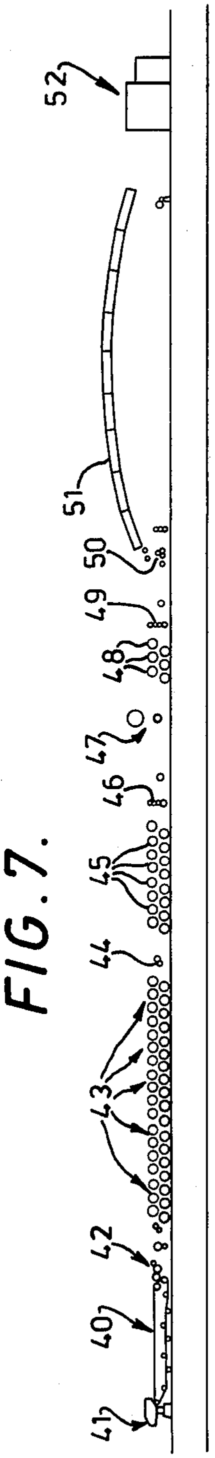
FIG. 7 is a schematic diagram, to a scale different from that of FIG. 6, of conventional apparatus for manufacturing a CFB sheet of which the base paper is conventionally dried and calendered.

Referring now to FIG. 7, there is shown apparatus comprising a single wire papermaking station generally designated 40, arranged to be supplied with pulp from a head box 41. A web produced at the station 40 is dewatered at a press felt station generally designated 42, and of which the felts are not shown, and finally is dried by a bank of drying cylinders 43. Starch is applied by means of a size press 44, and the web is then dried by means of a bank of drying cylinders 45. The web is then calendered at a calendering station 46 and CF coated at a coating station 47. The CF coating is dried by means of drying cylinders 48, and calendered at a calendering station 49. A CB coating is applied by a forward-roll coater 50, and smoothed by air-knives (not shown) before being dried at a drying station 51 and passed to a humidity conditioner 52.

As mentioned previously, FIGS. 6 and 7 are on the same scale, and it will, therefore, be realized that the present invention permits a considerable saving in space to be achieved. The apparatus shown in FIG. 7 is in fact 215 meters long, whereas that shown in FIG. 6 is only 68 meters long.

In exemplary manufacturing operations using the apparatus shown in FIG. 5 to produce CF, CB and CFB sheets according to the present invention, 49, 38 and 30 $g/m^2$ paper webs 13 were produced on the wire 11 from a fibre furnish of 70% softwood kraft pulp and 30% sulphite wood pulp with an 11% addition of china clay (based on dry fibre weight). The paper was dried on the first MG cylinder 12 to give a glazed surface having a Bendsten roughness of about 800 ml/min.

CF sheets were produced by blade coating an approximately 9 $g/m^2$ coating of an acidic clay onto the glazed surface of the paper web 13 by means of the apparatus 17. CB sheets were produced by air-knife coating an approximately 5 $g/m^2$ coating of 7 $\mu m$ diameter microcapsules onto the unglazed surface of the paper web 13 by means of the apparatus 19. CFB sheets were produced by applying acidic clay and microcapsule coatings as just described to the appropriate surfaces of the paper web 13.

On testing, the paper thus produced was found to be satisfactory.

I claim:

1. In a coated paper for use in pressure sensitive copying systems of the type which includes (A) a copying system comprising an upper sheet which is coated on its lower surface with pressure rupturable microcapsules containing a color former material, and a lower sheet coated on its upper surface with a color reactant material, and (B) a copying system as described in (A) which additionally comprises at least one intermediate sheet which is coated on its lower surface with microcapsules and on its upper surface with color reactant material, the improvement which comprises the coated paper being a machine glazed base paper having a smooth glazed surface and a rough surface having a Bendsten roughness of between about 700 and 1000 ml/min. and having a color reactant on the smooth glazed surface of the base paper when it functions as a lower sheet and having a microcapsule coating on the rough surface of the base paper, when it functions as an upper sheet, and having a color reactant on the smooth glazed surface of the base paper and a microcapsule coating on the rough surface of the base paper when said paper functions as an intermediate sheet, the rough surface of the paper being characterized by protrusions which extend farther from the body of the paper than microcapsules carried on said rough surface side of the paper.

2. A coated paper according to claim 1 wherein the glazed surface has a Bendsten roughness of less than 100 ml/min.

3. In pressure sensitive copying systems of the type which includes (A) a copying system comprising an upper sheet which is coated on its lower surface with pressure rupturable microcapsules containing a color former material, and a lower sheet coated on its upper surface with a color reactant material, and (B) a copying system as described in (A) which additionally comprises at least one intermediate sheet which is coated on its lower surface with microcapsules and on its upper surface with color reactant material, the improvement which comprises the upper, lower and intermediate sheet being a machine glazed base paper having a smooth glazed surface and a rough surface having a Bendsten roughness of between 700 and 1000 ml/min. and having a color reactant on the smooth glazed surface of the base paper when it functions as a lower sheet and having a microcapsule coating on the rough surface of the base paper, when it functions as an upper sheet, and having a color reactant on the smooth glazed surface of the base paper and a microcapsule coating on the rough surface of the base paper when said paper functions as an intermediate sheet, the rough surface of the paper being characterized by protrusions which extend farther from the body of the paper than microcapsules carried on said rough surface side of the paper.

4. A pressure sensitive copying system according to claim 3 wherein the glazed surface has a Bendsten roughness of less than 100 ml/min.

* * * * *